United States Patent [19]

Cunningham et al.

[11] 4,074,787

[45] Feb. 21, 1978

[54] SAFETY DEVICE FOR A FORK-LIFT EQUIPPED REFUSE VEHICLE

[75] Inventors: Richard I. Cunningham, Pittsburgh; Daniel E. Day, Watsontown, both of Pa.

[73] Assignee: Lenmar Industries, Inc., Pittsburgh, Pa.

[21] Appl. No.: 703,214

[22] Filed: July 7, 1976

[51] Int. Cl.² ............................................. B60T 7/12
[52] U.S. Cl. ................................... 180/82 B; 303/18
[58] Field of Search ............ 180/82 B, 82 R, 103 BF, 180/103 R; 214/302, 313; 303/18

[56] References Cited

U.S. PATENT DOCUMENTS

| 2,182,941 | 12/1939 | Cummings | 303/18 |
| 2,887,672 | 5/1959 | Murano | 180/103 R |
| 2,951,600 | 9/1960 | Dempster | 214/302 X |
| 3,026,004 | 3/1962 | Rowell | 180/103 X |
| 3,269,783 | 8/1966 | Kriz | 303/18 |
| 3,593,815 | 7/1971 | Inoue | 180/82 B |
| 3,612,619 | 10/1971 | Hayes | 303/18 |
| 3,768,088 | 10/1973 | Risius | 180/103 R |

*Primary Examiner*—Joseph F. Peters, Jr.
*Assistant Examiner*—R. Schrecengost
*Attorney, Agent, or Firm*—Bauer, Amer & King

[57] ABSTRACT

In a trash-collecting vehicle in which fork lifts raise the trash container into an elevated dumping position, a safety device is proposed which applies the vehicle parking brakes and thus immobilizes the vehicle against movement when the fork lifts are raised and thus are in a position capable of striking a ceiling projection, door frame, etc., or when a closure on top of the vehicle is also in a raised position and similarly is capable of striking a ceiling projection or the like.

4 Claims, 4 Drawing Figures

SAFETY DEVICE FOR A FORK-LIFT EQUIPPED REFUSE VEHICLE

The present invention relates to an improved trash-collection vehicle, and more particularly to a safety attachment for this type vehicle which, at minimum expense and effort, adopts the parking braking function of its two-part braking system to additionally immobilize the vehicle when it is vulnerable to accidents, such as when the fork lifts are raised, or when its top closure for its trash-carrying compartment is raised.

The requirements for a braking system of a trash-collection vehicle call for two independently operating or functioning units, one that brakes the vehicle when it is in motion, and the other which applies brakes to the vehicle for parking purposes. An important contribution of the present invention is the recognition that these just mentioned two braking functions, although utilized at different times, are operatively and structurally interrelated so that a safety function can additionally be achieved from the parking brakes, all as is hereinafter more fully explained.

Although it is already well known how to supervise an operating condition of a vehicle and to correspondingly restrict its movement, such as for example in U.S. Pat. No. 2,182,941, means to apply a separate braking function are utilized in these known devices, and thus there is additional cost and effort to install these devices. In accordance with the present invention, as already noted, the existing braking system is effectively used to immobilize the vehicle when, for example, the fork lifts are raised above the normal height of the vehicle, and the driver is thus not used to judging the new height thereof during movement. Statistically, the described condition frequently results in accidents, and thus immobilizing the vehicle at this time achieves a significant safety function without detracting in any way from the utility of the vehicle. Nor does it significantly add to the cost of the vehicle since the existing braking system of the vehicle is advantageously used.

The fork lift-equipped vehicle to which the within safety device is applied is of the type having a braking system including a spring biased parking brake-applying member operatively arranged for movement through a braking stroke from a ready position into a vehicle-braking position and means bounding a pressure fluid chamber in the path of said movement containing pressure fluid for normally holding said member against partaking of a braking stroke. A safety device which demonstrates objects and advantages of the present invention includes a fork lift position-indicating projection operatively arranged to have a pivotal traverse incident to movement of the fork lift into its elevated operative position above the vehicle. An elongated conduit is provided having communication at one end with the aforesaid pressure fluid chamber and is operatively arranged to have its opposite end located adjacent the path of pivotal traversing movement of the position-indicating projection. Completing the device is a normally closed valve disposed in sealing relation in said opposite conduit end and located in the path of the pivotal traverse so as to be urged from its normally closed valve position into its open valve position upon being contacted by the position-indicating projection. As a consequence, the vehicle parking brakes are automatically applied whenever the vehicle fork lift assumes its elevated operative position, to thereby prevent vehicle movement with the fork lift in this dangerous position.

The above brief description, as well as further objects, features and advantages of the present invention, will be more fully appreciated by reference to the following detailed description of a presently preferred, but nonetheless illustrative embodiment in accordance with the present invention, when taken in conjunction with the accompanying drawings, wherein.

Figure 1:
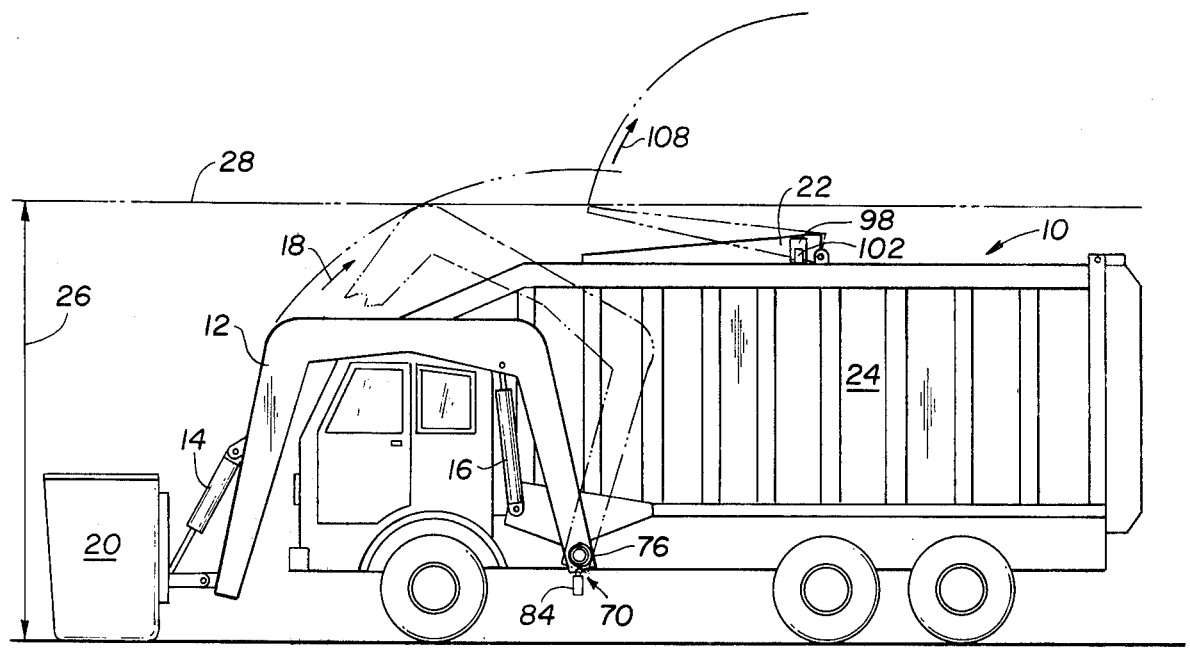
FIG. 1 is a side elevational view of a fork lift-equipped vehicle having a safety device according to the present invention, wherein positions of movement of the fork lift and also of the top closure for the vehicle body are illustrated in full line and phantom perspective.

Reference is now made to the drawings, and in particular to FIG. 1, which illustrates a conventional vehicle or truck, generally designated 10 which is used for collecting trash or refuse. To this end, the vehicle has a front fork lift 12 operated hydraulically, as by hydraulic devices 14 and 16, through a pivotal traverse 18 between positions of movement indicated by the full line and phantom line perspective. As a consequence, the fork lift 12 is capable of engaging, in a well understood manner, the container 20 and lifting the same into an elevated dumping position in which contents of the container 20 fall by gravity through an opening uncovered by the lifting of a top closure 22 into an internal compartment formed within the body 24 of the vehicle 10. The operation of vehicle 10, as just generally described, is well understood. During this operation, and particularly when the container 20 is raised into its elevated position, and also when the closure 22 is in its open and raised position, it should be readily appreciated that these structural features of the vehicle 10 are above the normal vehicle elevation or height 26, as represented by the horizontally oriented reference line 28. Experience has indicated that many accidents result during attempts to move the vehicle 10 at this time, since these structural features invariably strike something depending from a ceiling, the top of the garage door, etc. Apparently the user of the vehicle is accustomed to judge door openings and other obstacles in the path of movement by the normal height of the vehicle, and thus is guilty of miscalculation, which results in accidents and damage to the vehicle or building construction when attempting to move the vehicle 10 with either the fork lift 12 or the closure 22 in their respective raised positions.

In accordance with the present invention, the within safety device is readily applied to the vehicle 10 to cause its immobilization whenever the fork lift 12 is in its raised position, and also whenever the closure 22 is in its raised position. The fork lift 12 is, of course, the more significant structural feature which must be supervised since, because of its weight and mass, it is capable of causing considerably more damage than the top closure door 22. The top closure door 22, in fact, is often merely torn loose of its connection to the vehicle body 24 when inadvertently contacted while the vehicle is in motion, but it is important even to minimize this type of accident.

Figures 2, 3, 4:
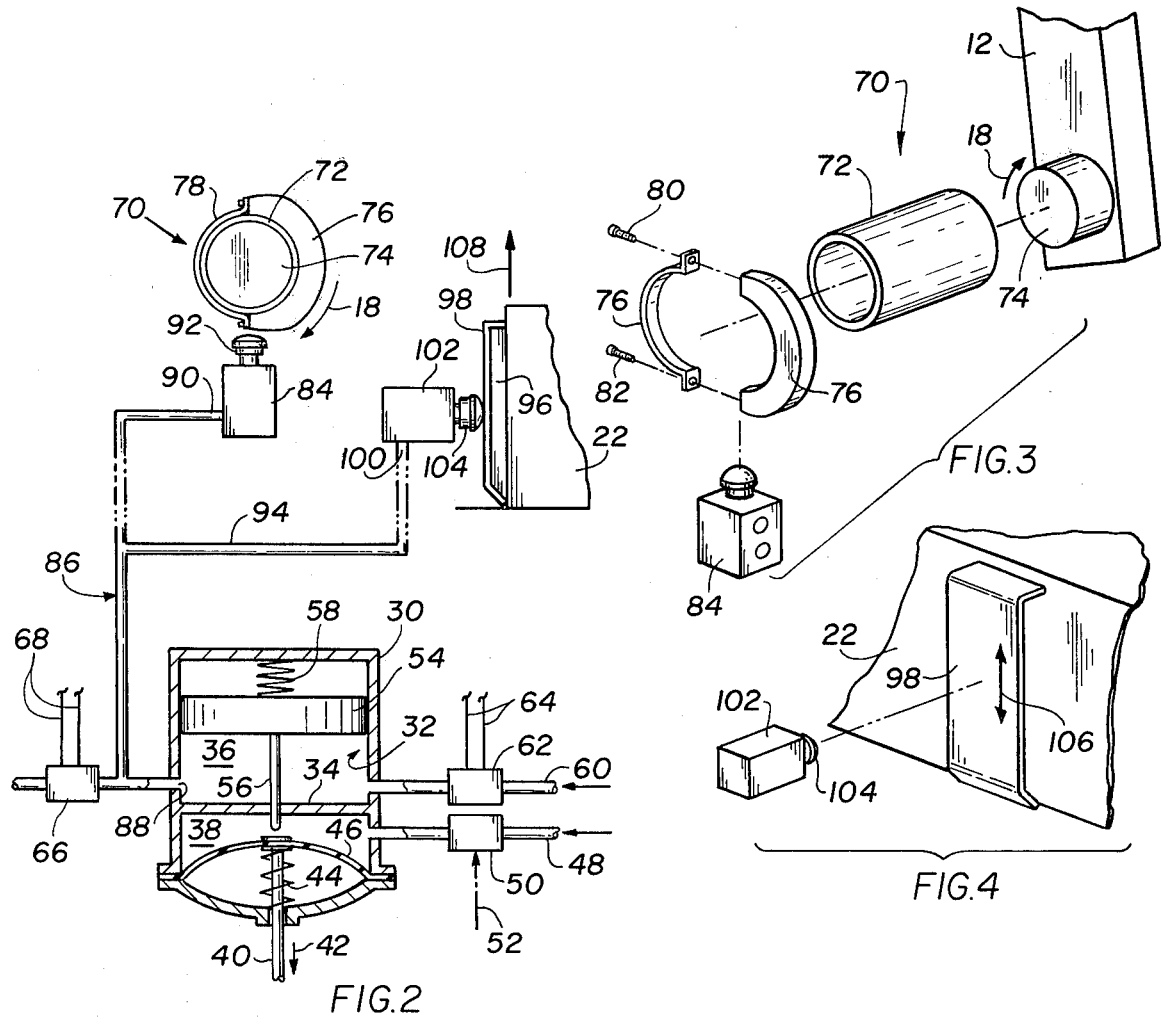
FIG. 2 is a diagrammatic view illustrating how the safety device hereof is installed for operation upon lifting movement of either the fork lift or the top closure.
FIG. 3 is a perspective view, in exploded form, of the components which operate the safety device hereof in response to pivotal lifting movement of the fork lift.
FIG. 4 is a perspective view, similar to FIG. 3, but of the components which actuate the safety device in response to lifting movement of the vehicle body top closure member.

An important contribution of the present invention is the recognition that the typical braking system which is utilized on a trash or refuse-collecting vehicle, such as the vehicle 10 illustrated herein, can be advantageously used in effectively operating a safety device to immobilize vehicle 10 when the fork lift 12 is raised. More particularly, as illustrated in FIG. 2, the typical braking system for a trash-collecting vehicle includes wall means 30 bounding a divided pressure chamber, generally designated 32. Specifically, a horizontally oriented dividing wall 34 separates chamber 32 into an upper compartment 36 and a lower compartment 38. Operatively arranged for reciprocating movement in the lower compartment 38 is a brake-applying rod 40 which, in a well understood manner, is adapted to be actuated through a braking stroke 42 preparatory to application of the vehicle brake which immobilizes the vehicle. Cooperating with the rod 40 is a return spring 44 which normally holds rod 40 in its ready position. Connected to the opposite end of rod 40 is a diaphragm 46. Lower compartment 38 communicates via a conduit 48 to a source of pressure air (not shown) and this conduit has appropriately disposed in it a normally closed valve 50 which is mechanically connected, as represented by the reference line 52, to the vehicle brake. Operating in a manner which is well understood, when the brake is applied, the movement of the brake is operatively arranged by an appropriate connection 52 to open the normally closed valve 50 which, in turn, then admits pressure air through the conduit 48 into the compartment 38. This has the effect of pressing down on the diaphragm 46 and thus actuating the rod 40 through its braking stroke 42 which, of course, applies the vehicle brake. The operation just described is what occurs during the time that the vehicle 10 is in motion and a situation, emergency or otherwise, presents itself which requires stopping the vehicle.

Associated with the braking function just described and which is related to the lower compartment 38, is a second braking function, normally reserved for parking the vehicle. This braking function is related to the upper compartment 36. More particularly, disposed in this compartment is a vertically reciprocating piston 54 having a depending actuating member 56 which is projected through the dividing wall 34 and, as should be obvious from inspection of FIG. 2, is designed to actuate the rod 40 through its braking stroke 42 is response to descending movement of the piston 54. Cooperating with piston 54 is a compression spring 58 arranged to bias piston 54 through descending movement to produce the braking stroke 42. However, the referred to descending movement in piston 54 normally does not occur because of pressure air admitted into the compartment 36 to normally hold piston 54 in its raised or ready position, except when the user desires to initiate operation of the vehicle parking brakes. To this end, compartment 36 is connected via a conduit 60 to the same pressure air source previously mentioned, and this conduit has appropriately connected in it an electrically operated valve 62 electrically connected by the electric conductors 64 to a dashboard "on-off" control switch (not shown). Cooperating with the valve 62 is a normally closed valve 66, also operated, in a preferred embodiment, electrically via the electrical conductors 68.

The mode of operation of the parking brakes for the vehicle 10 is well understood, but for completeness sake will now be generally described. Let it be assumed that the parking brakes are not operational and that under these assumed conditions valve 62 is opened and that pressure air therefore is admitted through the conduit 60 into the compartment 36. This pressure air is effective in lifting the piston 54 into its raised position against the urgency of the compression spring 58. This, of course, lifts the actuating member 56 clear of the brake-applying rod 40. As already indicated, valve 66 is normally closed and thus the pressure air is retained within the compartment 36. If the vehicle operator now wishes to apply the parking brakes, and appropriate switch is actuated which, in the preferred embodiment as illustrated herein, results in an electrical pulse being transmitted through the electrical conductors 64 and 68 to the valves 62 and 66, respectively. The result produced in the valve 62 is to close this valve and thus isolate the pressure air in compartment 36 from the source. Meanwhile, the effect on valve 66 is to pulse this valve from its normally closed into its open condition in which the pressure air is exhausted to atmosphere through the valve 66. The result of the pressure air exiting from the compartment 36 results in the compression spring 58 urging the piston 54 through downward movement which causes actuating member 56 to contact the rod 40 and urge this rod through a braking stroke 42. This, of course, results in the vehicle 10 being immobilized against motion during the time that it is parked and until valve 66 is closed and valve 62 is again opened to again admit pressure air into the compartment 36 thereby raising the piston 54 from its engagement with the brake-applying rod 40. Although the parking brake actuating system above described is electrically operated, its mode of operation may be actuated with the use of air pressure and air pressure sensitive valves to effect identical norms for applying and releasing the parking brakes.

In accordance with the present invention, the parking brake function just described in connection with compartment 36 is advantageously used to also operate a safety device to prevent movement of the vehicle 10 whenever the fork lift 12 is in its raised operative condition which, as already indicated, is a dangerous condition for vehicle movement. The contemplated safety device, generally designated 70 in FIG. 3 includes an adapter sleeve 72 which is force fit or otherwise connected to rotate in unison on an axial projection from the vehicle which extends laterally along the pivot axis of the fork lift 12. Thus, sleeve 72 rotates in unison with the fork lift 12 during the pivotal traverse 18 of the fork lift 12, which pivotal traverse was previously described in connection with FIG. 1. in connection with the positions of movement of the fork lift.

Mounted on the end of the sleeve adapter 72, and thus also moving in rotative unison therewith, is a fork lift position-indicating member, in the specific form of a cam segment 76. Cam 76 is mounted in position using a cooperating clamp 78 and clamping bolts 80, 82. Completing the safety device 70 as applied to the fork lift 12 is a normally closed valve 84 of a type commercially available from any number of sources.

Referring again to FIG. 2, the installation of safety device 70 is as follows. An elongated conduit 86 is connected to the pressure compartment 36, as at end 88, while the opposite end 90 is extended to within a strategic, proximate location to the path of movement of the cam segment 76 during its pivotal traverse 18 simultaneously with the fork lift 12. Appropriately connected in sealing relation to the conduit end 90 is the previously referred to normally closed valve 84. However, the actuating member 92 of the valve is located in the path of movement 18 and is thus adapted to be contacted by the cam segment 76 during the pivotal movement 18 thereof, and is thus cammed down into the valve 84, thereby causing this normally closed valve to assume its open condition. In doing so, valve 84 then functions as did the previously described valve 66, wherein the pressure air in compartment 36 normally holding the piston 54 in its raised, ready position is exhausted to atmosphere, thereby allowing piston 54 to partake of descending movement and thereby causing the application of the vehicle brakes to immobilize the vehicle against movement. During operation of valve 84 as just described, it will of course be understood that valve 62 is closed, thereby isolating the pressure air in compartment 36 from the source so that with the opening of valve 84 compartment 36 is emptied of pressure air. From the description already given, it should be readily apparent that the parking brakes will thus be applied whenever cam segment 76 partakes of pivotal traversing movement 18, and that this in turn will occur whenever the fork lift 12 is raised into its elevated position above the normal height 28 of the vehicle. Thus, vehicle 10 is effectively immobilized against movement whenever the fork lift 12 is in its raised and thus accident-prone condition, as previously explained.

Safety device 70 is also readily applied to sense the open or lifted condition of the top closure 22. To this end, conduit 86 in communication with the compartment 36 has a branch 94 which is extended to within a proximate position of the base of closure 22. As is perhaps best shown in FIG. 4, mounted on closure 22 is a bracket 96 which supports a switch-contacting member 98 that is vertically oriented, as illustrated. Appropriately disposed at the end 100 of conduit 94 is a normally open valve 102 which is commercially available from any one of a number of sources. By "normally open" is meant that the normal condition of the valve insofar as its components are concerned is one which permits passage of pressure fluid, such as compressed air, through the valve. However, the contemplated use of the valve 102 is one in which it is usually closed during significant periods of operation of the vehicle 10. In this respect, valve 102 is strategically located so that its switching component 104 is normally depressed against member 98, all as is clearly illustrated in FIG. 2, and thus valve 102 is in its closed condition. This condition of the valve 102 retains the pressure air within the compartment 36 thereby preventing operation or application of the parking brake functioning of the vehicle braking system. However, when closure 22 is lifted through movement 106, this releases the switching projection 104 and thereby allows valve 102 to assume its normally open condition. This, of course, results in the release of the pressure air from the compartment 36 to atmosphere through the valve 102, and thus results in descending movement in piston 54 under the urgency of the spring 58 which, in turn, causes the application of the vehicle parking brakes to thereby immobilize the vehicle.

Referring again to FIG. 4, it will be noted that member 98 is of a vertically elongated shape. The reason for this is that during movement of the vehicle 10 it is contemplated that bumps or other imperfections in the road may result in slight up and down movement of closure 22 which, of course, is cancelled out by the vertical height of member 98.

From the foregoing description, it should be readily appreciated that there has been described herein a device which contributes to the safety in the use of the vehicle 10 insofar as it immobilizes the vehicle against movement in a recognized dangerous condition, as when the fork lift 12 is raised above the normal height 28 of the vehicle, or when the closure 22 is in its raised condition, or possibly when both these conditions simultaneously exist. Moreover, for effective immobilization of the vehicle 10, the safety device hereof uses to advantage the normal functioning of the braking system that is usually part of the trash-collecting vehicle 10 described herein, and thus the safety device hereof is capable of being installed at minimum cost and with minimum modification to the vehicle 10.

A latitude of modification, change and substitution is intended in the foregoing disclosure, and in some instances some features of the invention will be employed without a corresponding use of other features. Accordingly, it is appropriate that the appended claims be construed broadly and in a manner consistent with the spirit and scope of the invention herein.

What is claimed is:

1. A safety device for a vehicle having a fork lift movable on a rotatable shaft to an elevated operative position; and a braking system including a pressure fluid chamber, a parking brake applying member within said chamber, a spring urging said member in a brake applying direction, and means for maintaining a pressure within said chamber for maintaining said member in a brake released condition, said safety device comprising a fork lift position-indicating projection mounted on said rotatable shaft of said fork lift so as to be operatively arranged to have a path of pivotal transversing movement incident to movement of said fork lift into said elevated operative position thereof, an elongated conduit in communication at one end with the aforesaid pressure fluid chamber and operatively arranged to have its opposite end located adjacent said path of pivotal traversing movement of said position-indicating projection, and a normally closed valve disposed in sealing relation in said opposite conduit end and located in said path of said pivotal traverse movement so as to be urged from its normally closed condition into an open condition upon being contacted by said position-indicating projection, whereby said vehicle parking brakes are automatically applied whenever said vehicle fork lift assumes said elevated operative position to thereby prevent vehicle movement with said fork lift in said operative position.

2. A safety device as claimed in claim 1 wherein said fork lift position-indicating member is a cam segment and said normally closed valve has a switching member projected therefrom, said projected switching member being adapted to be progressively urged through a valve-opening stroke upon contact being established therewith by said cam segment.

3. A safety device as claimed in claim 2 wherein said vehicle has a top closure pivotal between a closed and a vertically oriented raised condition, said safety device including position-sensing means operatively arranged to sense said raised condition of said closure and to immobilize said vehicle against movement by exhausting said pressure fluid chamber.

4. A saftey device as claimed in claim 3 wherein said closure position-sensing means includes a branch conduit connected at one end to said elongated conduit and at said opposite end to a valve, and valve opening and closing means responsive to said respective open and closed conditions of said closure.

* * * * *